United States Patent
Berbert

(10) Patent No.: US 11,628,654 B2
(45) Date of Patent: Apr. 18, 2023

(54) RECYCLABLE FILM

(71) Applicant: AMCOR FLEXIBLES NORTH AMERICA, INC., Neenah, WI (US)

(72) Inventor: Otacilio T. Berbert, Oshkosh, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 0 days.

(21) Appl. No.: 17/295,401

(22) PCT Filed: Dec. 21, 2018

(86) PCT No.: PCT/US2018/067167
§ 371 (c)(1),
(2) Date: May 19, 2021

(87) PCT Pub. No.: WO2020/131105
PCT Pub. Date: Jun. 25, 2020

(65) Prior Publication Data
US 2022/0001654 A1   Jan. 6, 2022

(51) Int. Cl.
*B32B 27/08* (2006.01)
*B32B 1/00* (2006.01)
(Continued)

(52) U.S. Cl.
CPC ........... *B32B 27/08* (2013.01); *B32B 1/00* (2013.01); *B32B 27/18* (2013.01); *B32B 27/306* (2013.01); *B32B 27/32* (2013.01); *B32B 27/34* (2013.01); *B32B 27/36* (2013.01); *B65D 65/40* (2013.01); *B65D 75/008* (2013.01);
(Continued)

(58) Field of Classification Search
CPC ........... B32B 27/08; B32B 1/00; B32B 27/18; B32B 27/306; B32B 27/32; B32B 27/34; B32B 27/36; B32B 2250/24; B32B 2255/10; B32B 2255/26; B32B 2270/00; B32B 2307/518; B32B 2307/7244; B32B 2307/7246; B32B 2439/40; B32B 2553/00; B65D 65/40; B65D 75/008
See application file for complete search history.

(56) References Cited

U.S. PATENT DOCUMENTS

| 5,482,770 A | 1/1996 | Bekele |
| 10,300,686 B2 | 5/2019 | Parkinson |

(Continued)

FOREIGN PATENT DOCUMENTS

| EP | 3700733 A1 | 9/2020 |
| EP | 3802125 A1 | 4/2021 |

(Continued)

OTHER PUBLICATIONS

PCT International Search Report, international application No. PCT/US2018/067167, dated Mar. 25, 2019, 2 pages.
(Continued)

*Primary Examiner* — Michael C Miggins

(57) ABSTRACT

Described herein are recyclable films with an outer surface comprising a polar polymer, such as polyamide, an inner surface comprising a sealant, and a polar polymer compatibilizer located between the polar polymer and the sealant. Preferably the outer surface is an outer layer of biaxially oriented polyamide and the inner surface is a multilayer inner film comprising the sealant and the compatibilizer.

20 Claims, 2 Drawing Sheets

(51) Int. Cl.
  *B32B 27/18* (2006.01)
  *B32B 27/30* (2006.01)
  *B32B 27/32* (2006.01)
  *B32B 27/34* (2006.01)
  *B32B 27/36* (2006.01)
  *B65D 65/40* (2006.01)
  *B65D 75/00* (2006.01)

(52) U.S. Cl.
  CPC ....... *B32B 2250/24* (2013.01); *B32B 2255/10* (2013.01); *B32B 2255/26* (2013.01); *B32B 2270/00* (2013.01); *B32B 2307/518* (2013.01); *B32B 2307/7244* (2013.01); *B32B 2307/7246* (2013.01); *B32B 2439/40* (2013.01); *B32B 2553/00* (2013.01)

(56) References Cited

U.S. PATENT DOCUMENTS

| | | |
|---|---|---|
| 2002/0197425 A1 | 12/2002 | Wolf et al. |
| 2003/0077466 A1 | 4/2003 | Smith et al. |
| 2005/0244664 A1* | 11/2005 | Bekele ................... B32B 27/18 428/474.7 |
| 2006/0246242 A1 | 11/2006 | Siegel et al. |
| 2009/0011263 A1 | 1/2009 | Forloni |
| 2010/0015423 A1 | 1/2010 | Schaefer et al. |
| 2012/0009739 A1 | 1/2012 | Nogi et al. |
| 2014/0017490 A1* | 1/2014 | Forloni ................... B32B 27/32 428/476.3 |
| 2015/0001234 A1 | 1/2015 | Sanfilippo et al. |
| 2017/0239920 A1 | 8/2017 | Gilbert |
| 2017/0348950 A1 | 12/2017 | Parkinson et al. |
| 2017/0349352 A1 | 12/2017 | Benthein |
| 2021/0206148 A1 | 7/2021 | Lahtinen et al. |

FOREIGN PATENT DOCUMENTS

| | | |
|---|---|---|
| JP | 10080988 A | 3/1998 |
| WO | 2016109023 A1 | 7/2016 |
| WO | 2017053221 A1 | 3/2017 |
| WO | 2019083675 A1 | 5/2019 |
| WO | 2019231442 A1 | 12/2019 |

OTHER PUBLICATIONS

Kaiser et al., "Recycling of Polymer-Based Multilayer Packaging: A Review", Recycling, vol. 3, No. 1, Dec. 22, 2017, page 1.
Katharina Kaiser, et al., Recycling of Polymer-Based Multilayer Packaging: A Review, published Dec. 22, 2017, MDPI.

* cited by examiner

RECYCLABLE FILM

TECHNICAL FIELD

This disclosure is related to films that can be easily recycled. More specifically, recyclable films that can be used for high-performance packaging applications.

BACKGROUND

High-performance packaging materials are designed to manage many different requirements. The packaging components, such as films, sheets or trays, are expected to deliver protection to the product in the form of physical characteristics such as oxygen barrier, light barrier, moisture barrier, puncture resistance, crush resistance, etc. Many products are packaged on high-speed packaging equipment, putting further demands on the packaging materials for runnability, often requiring specific stiffness, heat resistance and sealing characteristics. The package then has demands on durability through product distribution and use, requiring that barrier be maintained. Additionally, since the package is often a main source of product marketing, the appearance of the package is also critical.

As a result of these competing demands for the performance of the packaging materials, the structures often are designed with a combination of a variety of materials. Often the exterior of the laminate has a high durability material such as oriented polyamide or oriented polyester, which provide durability, heat resistance and good appearance. Barrier is provided by any number of materials or combinations of materials, including metals, polymers, paper, non-woven and various additives. The interior layer of the laminate often has a sealant layer that is capable of high-speed processing on packaging equipment, having specific COF and heat-sealing properties.

In recent years, there has been a focus on addressing sustainability related issues, especially in relation to high-performance packaging materials. Often, laminate that has multiple types of materials is disposed of in a waste stream. Development of sustainability options has included efforts to improve biodegradation or recycling. The development has resulted in many variations of packaging structures, but all have been found to have major cost and efficiency challenges.

One area of development includes the addition of compatibilizers to the recycling process in order to create miscible blends of otherwise incompatible polymer materials. Compatibilizer can be added to a multi-material coextrusions, in the exact portion needed to achieve acceptable processing and final product characteristics through the recycling. However, it has been found that these coextruded structures still have performance and appearance deficiencies when compared to many high-performance laminates.

There remains a desire to have a recyclable laminate suitable for high-performance packaging applications, retaining all of the performance characteristics of non-recyclable high-performance packaging laminates.

SUMMARY

High performance flexible packaging is designed to deliver speed, performance and cost efficiency in both the process to manufacture the packaging material and the process to manufacture a finished package. High performance packaging also provides protection to the products inside while maintaining an impressive appearance. Typically, high performance packaging materials are designed with a combination of materials to achieve these requirements. Unfortunately, this combination of materials often makes the packaging material difficult or impossible to recycle into a standard reprocessing or recycling stream. Described herein is a recyclable film having properties such that the film can be used for high performance packaging applications, without the disadvantages often experienced with currently available recyclable film. The high-performance packaging applications may include packaging items such as, but not limited to, food, industrial products, consumer goods, cleaning products, medical supplies, medical devices, pharmaceutical products, or nutraceutical products. The packaging could be fit for retail, bulk, commercial, industrial use or any other distribution.

Disclosed herein are recyclable films having 1) an outer surface comprising a polar polymer, 2) an inner surface comprising a sealant, and 3) a polar polymer compatibilizer located between the outer surface and the inner surface. The recyclable film may have an outer surface that is an oriented film and the polar polymer may be a polyamide. In some embodiments of the recyclable film, the outer surface is comprised essentially of polyamide. Some embodiments of the recyclable film contain a barrier material.

The recyclable film may essentially contain polar polymers and polyolefin polymers.

Additionally, disclosed is a package using an embodiment of the recyclable film.

Also disclosed herein are recyclable films having 1) an outer film that is oriented, the outer film having at least one polar polymer, 2) a sealant, and 3) a polar polymer compatibilizer located between the outer film and the sealant. The film may also have a barrier layer between the outer film and the sealant. The barrier layer may have ethylene vinyl alcohol copolymer in it. Alternatively, the barrier layer may be adjacent to the outer film.

The recyclable film may also have printed indicia located adjacent to the outer film.

The recyclable film may be made of at least 95% of polar polymers and polyethylene polymers.

In some embodiments of the recyclable film the outer film is a multilayer film.

Other embodiments of the recyclable film have 1) an oriented outer film having at least one polar polymer, and 2) a multilayer inner film attached to the outer film. The multilayer inner film has at least an inner layer comprising a sealant, and a polar polymer compatibilizer layer.

Further, the recyclable film may have an attaching layer between the outer film and the multilayer inner film and the multilayer inner film may have a barrier material.

Alternatively, the barrier material may be between the multilayer inner film and the outer film.

In some embodiments of the recyclable film, the outer film is BON. In other embodiments of the recyclable film, the outer film is OPET.

BRIEF DESCRIPTION OF THE DRAWINGS

The disclosure may be more completely understood in consideration of the following detailed description of various embodiments of the disclosure in connection with the accompanying drawings, in which.

Figure 1:
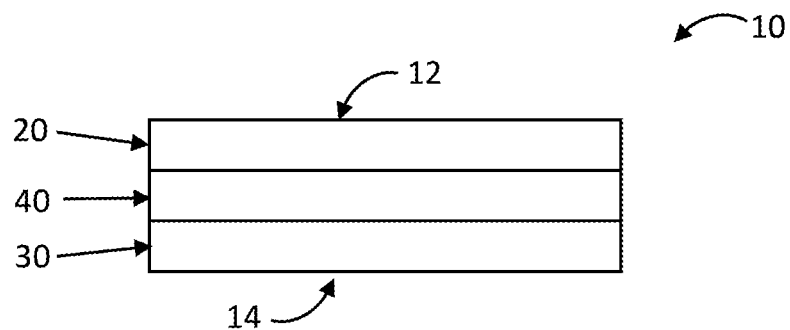
FIG. 1 is a schematic view of an embodiment of a recyclable film.

The drawings show some but not all embodiments. The elements depicted in the drawings are illustrative and not necessarily to scale, and the same (or similar) reference numbers denote the same (or similar) features throughout the drawings.

DETAILED DESCRIPTION

The challenge to the packaging industry is to improve the sustainability of the packaging components while maintaining the high-performance characteristics thereof. On the one hand, packaging producers should design and produce material that is easily recyclable (i.e. all polyethylene structures). Contrarily, packaging producers should design and produce material that has properties identical to current non-recyclable packaging as this material is designed for optimum performance and cost. The recyclable films disclosed herein have a unique and previously unrecognized solution that meets both of these requirements.

The recyclable films disclosed herein may advantageously be used as high-performance packaging films, among other uses. They are particularly useful to replace current non-recyclable films, gaining recyclability in a polyethylene product stream while maintaining important characteristics such as stiffness, heat resistance, product protection and durability. As compared to currently available recyclable films, the recyclable films disclosed herein can be processed on high-speed packaging equipment with little or no changes to the settings, maintaining packaging efficiency. Additionally, the recyclable films are designed such that film producers (i.e. converters) would not lose efficiency or recognize increases in material consumption when switching production from non-recyclable films to recyclable films.

The recyclable films comprise a) a polar polymer, b) a sealant and c) a polar polymer compatibilizer located between the polar polymer and the sealant. As shown in FIG. 1, the recyclable film 10 has an outer surface 12, the outer surface 12 including a polar polymer. The outer surface 12 may be an outer film 20. The recyclable film 10 has an inner surface 14, the inner surface 14 including a sealant 30. The recyclable film 10 has a polar polymer compatibilizer 40 located between the polar polymer and the sealant. As shown in FIG. 1, the polar polymer compatibilizer 40 may be in a layer located between the outer film 20 and the sealant 30. Also as shown in FIG. 1, the polar polymer compatibilizer 40 is located between the outer surface 12 and the inner surface 14. Preferably, the polar polymer compatibilizer 40 is not part of either the outer surface 12 nor the inner surface 14. The recyclable film is able to be processed in a polyethylene recycling process.

The recyclable films described herein may be recycled after their primary use is completed. In general, the term recyclable means that the product is suitable for reuse. An example of one specific context of recyclable is reusing a plastic grocery bag a second time to contain some other items. The plastic bag has been reused and recycled. In a slightly different context, recyclable means that the product is suitable for reuse after being converted into a new product. As used herein, the term "recyclable" or "recyclable film" is meant to indicate that the film can be converted into a new useful item by means of reprocessing in a polyethylene waste stream. Reprocessing may entail washing, separating, melting and forming, among many other steps. Typically, when plastic packaging is reprocessed, the material is mechanically chopped into small pieces and then melted to be reformed into the new product. If multiple incompatible materials are present in the packaging, interactions occur during reprocessing causing gels, brittle material, poor appearance and generally un-usable or poor-quality products. Using the term "recyclable" indicates that these drawbacks are generally not present. Qualification as a recyclable material is not regulated by any specific agencies but can be obtained from specific groups such as Association of Plastic Recyclers (APR) and How2Recycle™. Recyclable films disclosed herein may be suitable for "Store Drop-off" recycling streams. These streams may accept the following: 100% polyethylene bags, wraps, and films; very close to 100% polyethylene bags, wraps, and How2Recycle-approved polyethylene-based carrier packing with or without compatiblizer technology. Introduction of a recyclable film into any of these recycling-by-reprocessing avenues should not require additional compatibilizer.

Previously disclosed recyclable films containing polar polymers and polyolefins used compatibilizers specifically located in close proximity to the polar polymer layers. These films have layers containing polar polymers, such as EVOH or polyamide, and layers containing the compatibilizers, within the same portion of the recyclable film. In this way, as the film is processed through a recycling system (melting and mixing) the compatibilizer is critically located in very close proximity to the polar polymer. These types of films can be difficult to convert due to the vast differences in polymer characteristics being combined in a single film. Specifically, it can be difficult to extrude and orient a polar polymer layer, such as polyamide, and a relatively low melt index compatibilizer containing layer, together in the same film.

Surprisingly, it was found that the polar polymer and the compatibilizer can be more distantly separated within the recyclable film, and still be processed effectively through polyethylene recycling. Advantageously, the recyclable films disclosed herein have the compatibilizer separated from the polar polymer(s). In some embodiments, the polar polymers and the compatibilizer "distantly separated" by being located in separate films (i.e. outer and inner films, respectively), that are then bonded together to form the recyclable film. In some embodiments, the compatibilizer and the polar polymers may be adjacent to each other, but are not coextruded together (i.e. are not both in the outer film) any must be bonded to each other by some other means, such as adhesive. The separation of these materials in the recyclable film structure allows for less complicated processing, lower cost and higher-performance characteristics.

It was also surprising to find that oriented polar polymers were able to be recycled with the same success as non-oriented polar polymers. Orientation induces crystallinity within polymers which may delay the time required to re-melt the polymer during recycling. Most recycling is done at specific temperatures and speeds, allowing for limited melting and mixing. The recyclable films described herein were found to be recyclable into a standard polyethylene recycling process despite oriented polymers (requiring more heating time) and greater separation between the polar polymers and the compatibilizer (requiring more mixing).

The recyclable film has an outer surface that is exposed to the environment. When used in a packaging application, the outer surface of the recyclable film may be exposed to various surfaces of packaging equipment and in some cases, in direct contact with heated bars used for forming and sealing the package. The outer surface of the recyclable film may be exposed to any environmental objects and conditions that may be experienced through the life of the package, such as, but not exclusive to, other packages, secondary packaged (i.e. corrugated boxes), shelving, or humidity. As a result, the outer surface is subjected to a significant amount of abuse. When used in packaging applications the outer surface of the recyclable film is directed away from the product packaged inside.

The outer surface of the recyclable film comprises a polar polymer. As used herein, the term "surface" includes the material approximate to the location of the surface. In other words, the surface of a film includes the material of the film that is at, or adjacent to, the surface. As used herein, the term "polar polymer" is used to denote a polymer formed from at least one monomer that comprises at least one heteroatom, such as oxygen (O), nitrogen (N), phosphorus (P) or sulfur (S). Non-limiting examples of polar polymers that are typically used in packaging applications are polyamide, polyesters and ethylene vinyl alcohol copolymers (EVOH). Advantageously, polar polymers may provide better oxygen barrier, increased stiffness and increased heat resistance. Additionally, these properties may be enhanced upon orientation, as will be discussed below.

In some embodiments of the recyclable film the outer surface is oriented. Some embodiments of the recyclable film have an outer surface comprising polyamide, and the outer surface may be comprised essentially of polyamide.

The outer surface of the recyclable film may be an outer film, which may be monolayer or multilayer. The term "layer", as used herein, refers to a building block of films that is a structure of a single material type or a homogeneous blend of materials. A layer may be a single polymer, a blend of materials within a single polymer type or a blend of various polymers, may contain metallic materials and may have additives. Layers may be continuous with the film or may be discontinuous or patterned. In any form, the embodiments of the recyclable film that have an outer film have a polar polymer included in the outer film. Preferably, the polar polymer of the outer film is located on the outer surface of the recyclable film.

The outer film of the recyclable film may be oriented. Orientation may be mono-directional (machine direction or transverse direction), or bi-directional stretching of the film, increasing the machine direction and/or transverse direction dimension and subsequently decreasing the thickness of the material. Bi-directional orientation may be imparted to the film simultaneously or successively. Stretching in either or both directions is subjected to the film in the solid-phase at a temperature just below the melt temperature of the polymers in the film. In this manner, the stretching causes the polymer chains to "orient", changing the physical properties of the film. At the same time, the stretching thins the film. The resulting films are thinner and can have significant changes in mechanical properties such as toughness, heat resistance, stiffness, tear strength and barrier. These characteristics are important to retain in recyclable films (as compared to non-recyclable film) as they are often critical to the success of package conversion (i.e. the process by which packages are formed). Non-oriented film often suffers from lower heat resistance and may not be capable of running high line speeds on packaging equipment. Advantageously, some embodiments of the recyclable films use oriented polar polymers. Advantageously, some embodiments of the recyclable films use oriented outer films.

The amount of orientation imparted on a film can affect the properties thereof. It has been found that in the case of a machine direction oriented outer film, stretching of at least 2× (2 times) leads to optimal film properties, such as stiffness and appearance. However, film may be stretched to a level less than 2×. Biaxially oriented films may be stretched at similar levels as mono-oriented films, through either a tenter-frame process (flat die) or a bubble process (tubular die).

Also important to the properties of an oriented film is the annealing process. After orientation, films have an embedded stress. Upon heating the film, this stress may be released, causing the films to shrink back to their original, pre-orientation, size. This may be problematic when applying heat to the film during the process of heat sealing the recyclable film in a packaging application. Shrinkage of the oriented film at this point will result in a poor appearance in the heat seal area of the package. Additionally, a film that exhibits shrink under heat conditions will be very difficult to print (i.e. apply printed indicia), as this process generally uses high temperatures for drying. The process of annealing can help alleviate the embedded stress caused by orientation and the film will be "heat set" such that it will not shrink back to the original size at lower operating temperatures.

The outer film may be oriented and annealed in line. The outer film may be biaxially oriented and annealed in line using known processes, such as the triple bubble process. The outer film may be coextruded on a flat die system with machine direction orientation and annealing in-line. The outer film may be coextruded on a flat die system and machine direction stretched followed by transverse direction stretching (i.e. tenter frame orientation process) and annealing in-line. Alternatively, the processes of orientation and annealing may be done in separate processes.

As stated, the orientation process often induces higher crystallinity in a polymer than would have been present without orientation. While melting of an oriented film of a given polymer occurs at the same temperature as an unoriented film of the same polymer ($T_m$ remains the same), the melting process may take a longer period of time as the crystals lose their order. Surprisingly, it was found that orientation of the polar polymers within the recyclable film did not inhibit the recyclability of the film.

The recyclable film has an inner surface which is exposed to the environment. When used in a packaging application, the inner surface of the recyclable film may be exposed to various surfaces of packaging equipment and ultimately may come into direct contact with the product within the package.

The inner surface of the recyclable film comprises a sealant. As used herein, a "sealant" is a material, layer or film that allows the recyclable film to be bonded to itself or other packaging components, forming a package. A sealant may form a bond under the influence of pressure or heat or a combination of these conditions. A sealant may be in the form of a film or a coated layer and may be continuous or discontinuous (patterned). Embodiments of the recyclable film may include any known sealants such as, but not limited to, adhesives, hot melt, cold seal materials, heat seal films, and heat seal coatings.

The inner surface of the recyclable film may be an inner film, which may be monolayer or multilayer. The sealant of the recyclable film may be a polymeric based film, manufactured in a separate process, and subsequently adhered to the outer film. Alternatively, a sealant film may be extruded and simultaneously attached to the outer film in an extrusion coating type operation. Sealant films may be monolayer or multilayer and may be produced by any known processes. Ideally, the sealant film has not been oriented and has no embedded stress (i.e. the sealant film has zero or near zero free shrink). Alternatively, the sealant may be oriented, as well as fully or partially annealed.

In any form, the embodiments of the recyclable film that have an inner film have a sealant included in the inner film. Preferably, the sealant of the inner film is located on the inner surface of the recyclable film.

The sealant may be any type of material, or blend of materials, that will allow for bonding during a package production operation. Sealing materials need to be chosen based on the process to be used for sealing and the material/component that the recyclable film will be sealed to. Typical materials used for heat sealing include linear low-density polyethylene, ionomers and ethylene vinyl acetate copolymers, but may be chosen from a wide variety of known sealant materials.

Certain embodiments of the recyclable film include a multilayer inner film that incorporates other layers such as barrier layers, bulk layers, mechanical strength layers, pigmented layers, etc. The sealant film may even include polar polymers and compatibilizer layers.

The recyclable films also comprise a polar polymer compatibilizer that can assist in the incorporation of polar materials into a reprocessing or recycling stream of non-polar polymers. The polar polymer compatibilizer generally increases the stability of the dispersed polar material by providing sites that allow the two materials (polar and non-polar) to interact, increasing miscibility. Use of a compatibilizer in a blend of polar and non-polar materials generally creates a more homogeneous blend, avoiding gels and other issues that cause visual or mechanical property quality issues.

An example of a compatibilizer that can be used as the polar polymer compatibilizer is Retain 3000, available from The Dow Chemical Company. The details of this material and the use of it as a compatibilizer for polar materials is outlined in patent document WO16109023, Parkinson et al. (i.e. '023), which is incorporated herein by reference. However, the films disclosed in '023, do not include any form of oriented films, thus lacking in dimensional stability and stiffness required for many high-performance packaging applications. Additionally, the films disclosed in '023 incorporate the polar polymers and the polar polymer compatibilizer within the same film, near one another.

In some embodiments of the recyclable film, the polar polymer compatibilizer is a blend of polyethylene and a low molecular weight anhydride or carboxylic acid functionalized polyethylene.

While the examples and description of polar polymers herein includes polyamide, polyester and EVOH, the polar polymers of the recyclable film are not to be restricted to these materials. While the examples and description of the compatibilizers include materials that compatibilize polyamide, polyester and EVOH into non-polar polymer recycling streams, the compatibilizers of the recyclable film are not to be restricted to these materials. Another polar polymer may be used along with a functional compatibilizer suited to that polar polymer and it is still within the spirit of this disclosure.

The polar polymer compatibilizer is located between the polar polymer and the sealant. The polar polymer compatibilizer may be located between the outer film and the sealant. The polar polymer compatibilizer may be located between the outer film and the inner film. The polar polymer compatibilizer may be located within (i.e. part of) the multilayer inner film.

Advantageously, the polar polymer compatibilizer is not located within (i.e. part of) the outer film. Even though the polar polymer compatibilizer is separated from the polar polymer of the outer surface, it has been found that the compatibilizer is still able to function properly through a typical polyethylene recycling process, enabling incorporation of the polar polymer into the rest of the polyolefin-based material. Further, incorporation of the polar polymer compatibilizer into a portion of the recyclable film that is not the outer film allows for overall material savings and better film performance. Incorporation of the compatibilizer into a portion of the film such as the inner film creates a recyclable film that is more similar to current non-recyclable high-performance packaging films. The recyclable films disclosed herein are easier and more economical for film converters to produce due to the similarity to current films. The recyclable films disclosed herein are easier for package converters to process due to the similarity of film properties to the non-recyclable films they currently process.

Figure 2:
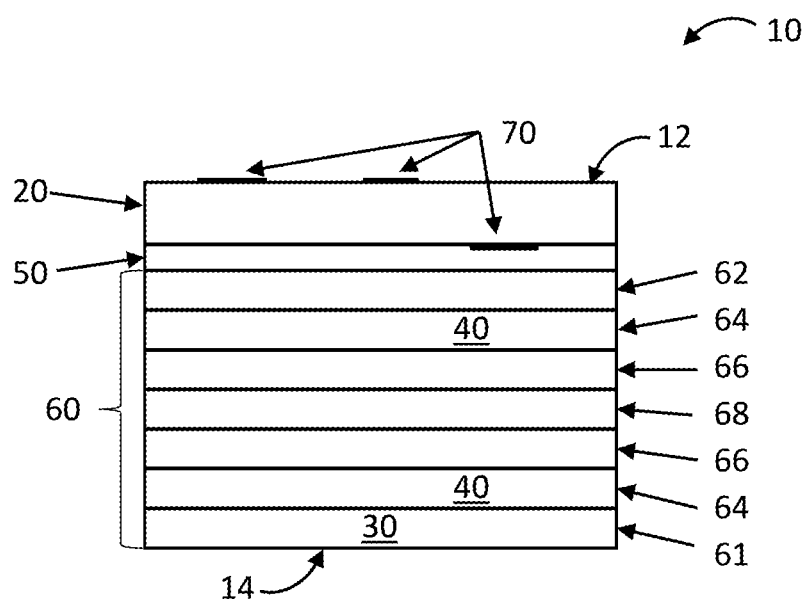
FIG. 2 is a schematic view of another embodiment of a recyclable film

Some embodiments of the recyclable film incorporate an outer film and an inner film. A specific embodiment of such a recyclable film 10 is shown in FIG. 2, which shows an outer film 20 attached to an inner film 60 by an attaching layer 50.

The outer film may be a monolayer film such as biaxially oriented polyamide (BON), oriented polyester (OPET), or oriented ethylene vinyl alcohol copolymer (EVOH). The outer film may be a multilayer film of any number of layers, including, but not limited to layers including polyamide, polyester and EVOH. The outer film should have high heat resistance and good durability.

A particularly good choice for the outer film is BON, as it has excellent heat resistance, excellent durability, and moderate barrier. As discussed, it is preferable for the outer film to be oriented and annealed. This gives the polymer film better properties, including excellent dimensional stability. An oriented film, such as BON, can be register printed with tight repeat tolerances as required for most high-performance packaging applications.

It is particularly advantageous to utilize BON or OPET as the film for the outer surface of the recyclable film. These films are often used in non-recyclable high-performance packaging film structures and packaging equipment is often designed specifically for running these types of materials very well. The heat resistance and surface characteristics of these films allow for high line speeds and packaging efficiency. Films that use these materials as the outer surface also have a high-quality appearance as compared to most polyolefin materials that can suffer from scuffing, shrinkage and low gloss. The appearance of the package can be critical for the market success of many packaged goods. In addition, BON and OPET are considered commodity materials and often have a lower cost than a specialty film that incorporates a compatibilizer.

Orientation of the outer layer is advantageous to the overall recyclable film as it allows for less polar polymer to be utilized while maintaining the high-performance properties due to the film strengthening during orientation. Material reductions are not only recognized as less polar polymer is necessary, but less polar polymer compatibilizer is required.

Since it is desired to have the outer film oriented, it may also be advantageous to not incorporate the polar polymer compatibilizer into the outer film. Typically, the polar polymer and the polar polymer compatibilizer have vastly different physical characteristics such as melt temperature, softening temperature, rheological characteristics, etc. This can make it difficult to control an orientation process for a film that contains both materials. The materials may have competing requirements for the orientation process. While it may be possible to incorporate a polar polymer and a polar polymer compatibilizer in a single oriented web, it is more difficult, less efficient and likely costlier.

The inner film may be a monolayer film comprising a sealant material or blend of materials, or a multilayer film containing any number of layers. In any embodiment of the recyclable film that has an inner film, the inner surface of the inner film comprises a sealant.

A multilayer inner film may comprise the polar polymer compatibilizer. This is an advantageous location for the compatibilizer from a film converting perspective. Typically, the inner film is not oriented and a compatibilizer of nearly any composition can be incorporated into a layer of the inner film, assisted through the extrusion process by other polymers and other layers of the multilayer film. Additionally, it is very common for inner films of packaging films to have many layers (i.e. 7, 9 and 11 layers are common), thus the compatibilizer can easily be incorporated along with many other layers as may be needed for any given application.

A multilayer inner film may contain other layers such as, but not limited to, oxygen barrier layers, moisture barrier layers, bonding layers, and bulk layers, as is known in the art. Each layer may be a blend of polymeric materials and may incorporate any typical additives. Layers of the inner film may contain recycled content such as post-consumer recyclate or post-industrial recyclate. Specifically, a layer of the inner film may contain reprocessed scrap, such as edge trim, from the production of the inner film or recyclable film itself (i.e. closed loop industrial recycling). The inner film may even include additional polar layers along with additional compatibilizer layers.

The outer film and the inner film may be attached to each other by any known means, including but not limited to, lamination, thermal bonding or other energy-based bonding. In some cases, the outer film and the inner film will be connected by an attaching layer comprising an adhesive. Typical adhesives are polyethylene type polymers or two component reactive adhesives. Any other bonding material or technique may be used to attach the outer film to the inner film.

FIG. 2 shows a non-limiting example of a recyclable film 10. In this case, the outer film 20 is a monolayer film, having an outer surface 12. The outer film 20 may comprise any polar polymer, such as, but not limited to, polyamide. The outer film may be oriented. Additionally, the outer film may be optimized for cost and performance by being a monolayer film of polyamide.

The outer film may comprise essentially of polyamide. The outer film may be a BON film. The outer film may also have printed indicia 70 located on either of the major surfaces. The outer film 20 is connected to an inner film 60 by an attaching layer 50. The inner film 60 comprises many layers including an inner layer 61, an outer layer 62 and several interior layers. The inner layer 61 comprises a sealant 30 on the inner surface 14 of the recyclable film. Two of the interior layers 64 are bulk layers and comprise the polar polymer compatibilizer 40. Two of the interior layers 66 are tie layers and contain polymeric bonding agents. The central interior layer 68 of the inner film 60 is a barrier layer that contains a barrier material of ethylene vinyl alcohol copolymer (EVOH). The polar polymer compatibilizer has been easily incorporated into the bulk layers of the inner film yet are still capable of providing the proper functionality to allow incorporation of the polar polymers of the outer film and the EVOH of the inner film in the polyethylene recycling process.

Figure 3:
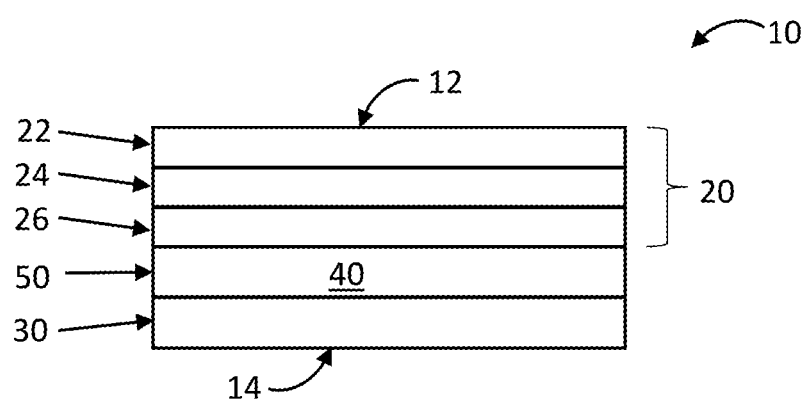
FIG. 3 is a schematic view of another embodiment of a recyclable film.

FIG. 3 shows a non-limiting example of a recyclable film 10. In this case, the outer film 20 is a multilayer film having an outer layer 22, an inner layer 26 and one interior layer 24. As used herein, an "interior layer" is a layer of a film that has both major surfaces in contact with another layer of the film. The outer film of the recyclable film may have any number of layers. The outer surface 12 of the recyclable film comprises a polar polymer. In some embodiments, the outer film is oriented. In some embodiments of the recyclable film, the outer film is oriented and annealed. An example of a multilayer outer film has a structure of polyamide/EVOH/polyamide and is biaxially oriented.

In the embodiment of FIG. 3, the outer film 20 is attached to the sealant 30 by an attaching layer 50. The attaching layer 50 also comprises the polar polymer compatibilizer 40. Bonding of the outer film and the sealant may be done by a technique known in the art as polyethylene lamination. In this case, the polyethylene laminate is the attaching layer 50 and provides a convenient place to incorporate the polar polymer compatibilizer. Again, even though the compatibilizer is not in the same outer film as the polar polymer, it has been found that it is functional in allowing the polar polymer to be incorporated into the polyethylene during recycling.

A recyclable film, such as the embodiments shown in FIGS. 2 and 3, may be comprised of polyolefins, such as polypropylene or polyethylene, polar polymers and small amounts of additional additives and components required for film processing. The recyclable film may comprise essentially of polar polymers and polyolefin polymers. The recyclable film may comprise at least 95% polar polymer and polyethylene materials.

The majority of the recyclable film comprises polyethylene materials. Polyethylene is the name for a polymer whose basic structure is characterized by the chain —$(CH_2\text{-}CH_2\text{-})_n$. As used herein, the term "polyethylene" includes homopolymers and copolymers of ethylene.

In addition to the outer film and inner film described previously, the recyclable film may contain other films or layers. An "interior film" may be present between the outer surface and the inner surface. Any additional films may be connected to the already described film components by any means known. The recyclable film may have any number of films or layers.

As previously mentioned, the recyclable film may include a barrier material for decreasing the transmission rate of gases or other vapors through the film structure. Many high-performance packaging structures include barrier materials such as EVOH, foil, metalized films, PVdC, polyamide or oxide coated films to achieve the low transmission rates required for extending the shelf life of the product packaged. Many packaged foods and pharmaceuticals (as well as other products) are sensitive to their environment and require a very limited transmission rate through the packaging components. Typically, the barrier materials or barrier layers are tuned to low transmission of oxygen or moisture. A barrier material may be incorporated into the recyclable film in any location.

There may be a barrier layer located within the outer film of the recyclable film. A non-limiting example is an outer film with at least one polar layer containing EVOH. EVOH has excellent oxygen barrier, which is enhanced upon orientation. EVOH in the outer film could provide an improved effect of good barrier, good heat resistance, good thermal stability, printability and good appearance.

In some embodiments, there may be a barrier layer within the inner film or another interior film of the recyclable film. Traditional non-recyclable high-performance packaging materials often use extrudable barrier materials such as EVOH or polyamide in multilayer films. This type of film structure could be incorporated into the recyclable films as well, if there is enough compatibilizer in the recyclable film to allow for recycling of the film in the polyethylene recycling stream without the need for additional compatibilizer.

In some embodiments of the recyclable film, there may be a barrier layer located between the outer film and the sealant. An oriented outer film provides an excellent opportunity to apply coatings, as it has the proper heat resistance, low shrink and thermal stability to withstand the processes necessary for applying the barrier material. For example, an oriented and annealed outer film could go through a metalization process that would deposit a thin layer of aluminum to an outer or inner layer. In some embodiments, the outer film may have printed indicia applied followed by a barrier coating. Alternatively, the outer film could have a barrier layer applied first, followed by an optional printed indicia application. Barrier coatings may be any known chemistry, such as crosslinked acrylates or partially neutralized acrylic polymers. Thin layers of depositions or coatings may be useful for the recyclable films as the amount of material used can be easily incorporated into the recycling stream without the need for compatibilizers.

As indicated previously, the recyclable film can incorporate printed indicia. The indicia may be incorporated into the recyclable film by any known process. High performance packaging is typically converted in high speed processes such as rotogravure printing, flexographic printing, or digital printing. For many applications, the printed indicia that is applied to the film is registered with tight repeat tolerances (i.e. each impression of print must be nearly identical in size). The dimensional stability of the oriented and annealed outer films at elevated temperatures as described herein is useful for these types of printing processes. The outer film can have high quality printing (i.e. printed indicia) applied to either or both sides. As shown in FIG. 2, the printed indicia may be located between the outer film and the sealant, protecting the indicia from external abuse such as scuffing.

The outer film may have a primer applied or another treatment (i.e. corona treatment) prior to printing, coating or laminating to facilitate good wetting and adhesion. Printed indicia applied to the outer surface of the recyclable film may also include a protecting layer or another layer to create a visual or tactile effect. The printed indicia may be incorporated as a continuous layer or applied as a pattern or vignette (an image created by dots). The printed indicia may be continuous with the recyclable film or only cover a small portion of the film. The printed indicia may be visible from either or both sides of the recyclable film.

While the purpose of the proposed recyclable film is to create a material that can be used in high performance packaging applications and recycled after use, the film may also contain materials that have been recycled. Recycled materials such as previously used packaging (post-consumer recyclate) or film converting trim waste (post-industrial recyclate) may be incorporated into any portion of the recyclable film. The material may not require compatibilizer or a compatibilizer may be added at the point of incorporation.

The outer film, inner film, interior film, attaching layer, sealant or any other portion of the recyclable film may incorporate any other additives known to be used in packaging films. These additives may include, but are not restricted to, nucleating agents, processing aids, pigments, slip, or antiblock. Additives may also be "active" in nature, with the intended purpose of interacting with the environment. One example of an active additive is an oxygen absorber.

The recyclable film may have any overall thickness as necessary for the application in which it will be employed. Recyclable films for packaging applications may have a thickness from 1 mil (25.4 micron) to 20 mil (508 micron). The thickness of the recyclable film may be from 1.5 mil (38.1 micron) to 10 mil (254 micron), or from 2 mil (51.7 micron) to 5 mil (127 micron).

The stiffness of the recyclable film is an important attribute of the recyclable films described herein. The oriented outer film provides for improved stiffness over previously described recyclable packaging webs. Some embodiments that incorporate an outer film that has two polar layers separated by a non-polar layer exhibit especially good stiffness characteristics. The stiffness of the recyclable film may be critical to successful converting of the film on packaging equipment used today. In this manner, adoption of the recyclable film into current packaging applications can be made without higher costs or process inefficiencies. Additionally, the stiffness of a film used as packaging can provide a perception of higher quality and is valued by consumers.

The recyclable films described herein have heat resistance such that they may be used as high-performance packaging films. The outer surface is configured to withstand the high temperatures that the packaging film may encounter, such as, but not limited to, heat from film converting, high temperature heat seal units, high temperature processing such as hot fill or retort, or high temperature consumer use such as microwaving. Heat resistance is evident by low shrink, among other properties. When experiencing a high heat environment, the recyclable film should not shrink or otherwise distort. For example, the heat sealed areas on a high-performance package should be smooth and clean, without marring or any indication of shrinking or puckering.

The recyclable films disclosed herein are superior to previously developed recyclable films. Films that utilize only polyethylene materials or films that use polyolefin materials as the outer surface are prone to scuffing and durability issues. Films that utilize polar materials such as polyamide have increased heat resistance and durability, but still may fall short of currently available non-recyclable films. However, the recyclable films described herein have heat resistance and durability that mimics non-recyclable films that have BON or OPET exterior layers. The embodiments that employ oriented and annealed outer films with outer layers of polar materials are especially advantageous for achieving recyclable films that can be used as high-performance packaging that can be converted and distributed while retaining very good appearance.

The material selection and processing conditions disclosed herein are critical to achieving a low shrink, heat resistant material. Using polar polymers, such as polyamide, in the outer film, in combination with orientation and annealing at the proper conditions, creates a film that exhibits low shrink and good thermal stability at conditions of interest. An analytical approach to testing a materials suitability for high performance packaging applications is free shrink. "Free shrink" is defined to be values obtained by measuring unrestrained shrink at 90° C. for five seconds. Five test specimens are cut to 10 cm. in the machine direction by 10 cm. in the transverse direction. Each specimen is completely immersed for at least 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen for each direction. The machine direction shrinkage for the five specimens is averaged for the machine direction shrinkage value of the given film sample, and the transverse direction shrinkage for the five specimens is averaged for the transverse direction shrinkage value.

The outer film may have a machine direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. The outer film may have a transverse direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. Preferably, the outer film has a machine direction shrink rate of less than 7% and a transverse direction shrink rate of less than 1%, when exposed to heat less than or equal to 90° C. Preferably, the outer film has a machine direction shrink rate of less than 5% and a transverse direction shrink rate of less than 5%, when exposed to heat less than or equal to 90° C. The outer film may have a shrink rate of less than 2% in the machine direction and 0% in the transverse direction when exposed to heat of 90° C. The outer film may have a shrink rate of less than 1% in the machine direction and 0% in the transverse direction when exposed to heat of 90° C.

Similarly, the recyclable film may have a machine direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. The recyclable film may have a transverse direction shrink rate of 10% or less than 10% upon application of heat less than or equal to 90° C.; or less than 9%, less than 8%, less than 7%, less than 6%, less than 5%, less than 4%, less than 3%, less than 2%, or less than 1%. Preferably, the recyclable film has a machine direction shrink rate of less than 7% and a transverse direction shrink rate of less than 1%, when exposed to heat less than or equal to 90° C. Preferably, the recyclable film has a machine direction shrink rate of less than 5% and a transverse direction shrink rate of less than 5%, when exposed to heat less than or equal to 90° C. The recyclable film may have a shrink rate of less than 2% in the machine direction and 0% in the transverse direction when exposed to heat of 90° C. The recyclable film may have a shrink rate of less than 1% in the machine direction and 0% in the transverse direction when exposed to heat of 90° C.

As has been discussed, the recyclable film may contain a barrier layer or barrier material. The recyclable film may exhibit high oxygen or moisture barrier as may be required by packaging applications. Barrier layers may also protect outer films/layers from migration from package contents (for example, oils and the like). The recyclable film may have oxygen transmission levels of less than 1,000 $cm^3/m^2/24$ hours when tested at 0% RH and 23° C. following ASTM F1927. The recyclable film may have oxygen transmission levels less than 100, less than 10, less than 5, or less than 1 $cm^3/m^2/24$ hours. The recyclable film may have moisture transmission levels of less than 100 $g/m^2/24$ hours when tested at 90% RH and 23° C. following ASTM F1249. The recyclable film may have moisture transmission levels of less than 10, less than 5, or less than 1 $g/m^2/24$ hours.

For high performance packaging applications, the recyclable film may have near 100% barrier to visible light (opaque to light), or at least 50% barrier to visible light. This type of recyclable film would be appropriate for packaging applications where a view of the product was not desirable or when light is detrimental to the shelf life of the product.

Alternatively, the recyclable film may have high light transmission and clarity, as is often desirable for packaging applications when it is desirable to view the product through the packaging material. The recyclable film may have a clarity of more than 80%, 85% or 90%. Ideally, the recyclable film should have a clarity of at least 95%, at least 95.5%, at least 96%, at least 96.5%, at least 97%, at least 97.5%, at least 98%, at least 98.5%, at least 99%, at least 99.5%, or 100%, and all values there between, when measured in accordance with the instructions and teachings of ASTM D-1003. Clarity is defined as the percentage of transmitted light that deviates from the incident light by less than 2.5 degrees. The clarity of the outer film can be affected by material selection and orientation conditions, as is known in the art.

As has been discussed, the appearance of the packaging material is critical performance criteria for many high-performance packaging applications. In addition to high clarity and high-quality printed indicia, it is often desirable to have a high gloss exterior. The outer film may have gloss levels greater than 50, 60, 70 or even 80 (45° gloss, units, ASTM D2457). This type of gloss is superior to recyclable packaging films containing outer surfaces based on polyethylene materials.

When used as a packaging film, the recyclable film may be sealed to itself, or a similar film, or to one or more other packaging components. Other packaging components may include, but are not limited to zippers, fitments, cups or trays. The packaging may also include other components such as patches, liners, sleeves or labels. The package may include scores, perforations or lines of weakness for functionality such as, but not exclusive to, venting or opening. The package may be formed from one, two, three or more different packaging components.

The recyclable film is sealed, or connected, to itself or other packaging components to create a hermetically sealed package. The seals may be made by adhesives, heat sealing, ultrasonic sealing, cold sealing, RF welding or any other known bonding method. Hermetic packaging is critical for a wide variety of products, including foods, beverages, pharmaceuticals, consumer goods and other sensitive products. Hermetic packaging can help prevent damage to the product. For many products, achieving good heat seals to create consistently hermetic packages is highly critical. An advantage of the recyclable films disclosed herein is that they have nearly identical characteristics to non-recyclable packaging films (i.e. good heat resistance, high stiffness, good durability, etc.) and thus can be formed into hermetic packaging on a more reliable basis. The combination of the high heat resistance of the outer film and the sealant layers that provide quality seals is an important advantage to the films presented herein.

It is also an advantage of some embodiments of the recyclable films disclosed herein that they are provided with sealants that achieve peelable seals when heat sealed to other packaging components. Packages can be opened by consumers in many ways, including peeling open manually. Peelable seals are those that can be peeled open by a consumer by hand, without the use of another tool. A consumer can grasp two parts of a package and pull the package open at a heat seal. Peelable seals allow for the product within the package to be easily accessed by the consumer. In some cases, peelable seals can also be manually reclosed and resealed. Additionally, the recyclable films may have peelable heat seals to allow for easy separation of the packaging components. This advantageously allows for proper disposal of the packaging components into other recycling streams or waste streams. Each packaging component included in the hermetically sealed package may be recyclable in the same stream as the recyclable film, recyclable in a different stream or not recyclable at all.

Figure 4:
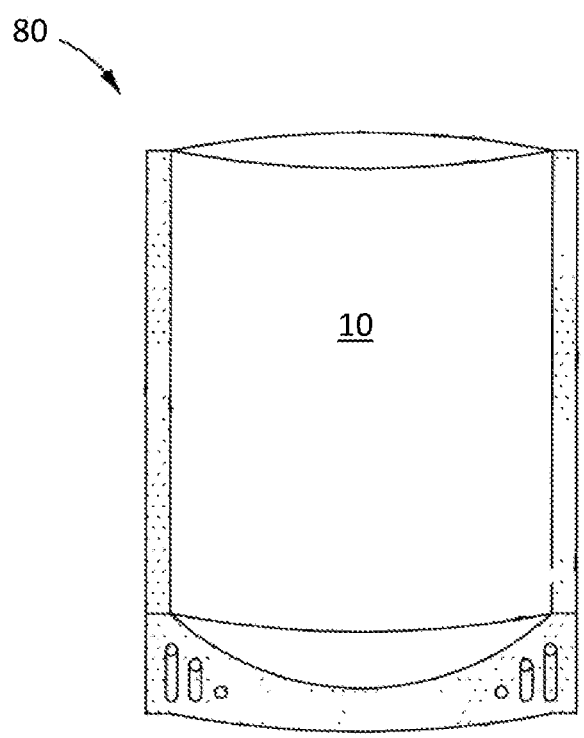
FIG. 4 is an embodiment of a package comprising a recyclable film.

The recyclable film may be used in any sort of hermetic package format including, but not limited to, pouches, bags, flow wrap, tray/lid, chub, bulk bag, and blisters. One example of a package 80 using a recyclable film 10 is shown in FIG. 4, where the package is a stand-up pouch. The recyclable film may be used to package any type of product including, but not limited to, dry foods, liquids, meats, cheese, fresh foods, frozen foods, beverages, pharmaceuticals, nutraceuticals, cosmetics, hard-to-hold products, cleaners, chemicals, wipes, medical products, electronic devices, pet foods/treats, bulk products, etc.

Some embodiments of packages that use the recyclable films disclosed herein are in the format of a pouch, bag or sachet. In this format, the recyclable film is used as in at least one of the side-walls of the package, or in some cases, all the side walls. A pouch or bag may be sealed in a fin seal or lap seal configuration. A sachet may have side seals and end seals. Fitments or other closures may be sealed to any part of the recyclable film.

Ideally, the package is configured such that after the contents have been emptied, the package may be opened fully, and the packaging components separated as necessary, for optimal emptying (product removal), rinsing, and recycling. Complete product removal means that the package is free from significant amounts of product that would contaminate the recycling process. Complete product removal may be determined by visual inspection. Complete product removal may be accomplished by rinsing the opened packaging components with water until most or all the product has been removed.

The separation of the packaging components may be facilitated by the previously mentioned peelable seals, or by any other means such as weakened lines or perforations that can be torn open. In some cases, the recyclable film and the other packaging components are designed to be easily torn or cut to facilitate opening. In some embodiments, packaging components remain attached to the recyclable film and are capable of being recycled in the same recycling stream.

The size of the package in which the recyclable film is used is unlimited. The packaging could be very small (a few square inches) or very large, as is the case for bulk container liners. A bulk liner may be made from a recyclable film and in some embodiments, a bulk liner may be made from several plies of recyclable film. The bulk liners may have fitments attached to either surface.

In some embodiments, the recyclable film is in the form of a lid that is attached to a tray or cup. The tray or cup may be flexible, semi-rigid or rigid and can be made of any material including, but not limited to, polyester, polyethylene, polystyrene, polypropylene, paper, metal, glass or ceramic.

The recyclable films described herein may also be used for applications that are not related to packaging.

Unless defined otherwise, all technical and scientific terms used herein have the same meanings as commonly understood by one of ordinary skill in the art to which this invention belongs. All publications and patents specifically mentioned herein are incorporated by reference for all purposes.

The following examples are offered for illustrative purposes only and is not intended to limit the scope of the present invention in any way. Indeed, various modifications of the invention in addition to those shown and described herein will become apparent to those skilled in the art from the foregoing description and the following examples and fall within the scope of the appended claims.

EXAMPLES & DATA

Packaging Test

A trial was run on a packaging machine that uses rollstock film to create a shaped stand up pouch holding 400 mL of a cleaning product. The current non-recyclable structure has an outer film of oriented polyester, an interior film of oriented polyamide and an inner film of polyethylene-based sealant (OPET/BON/PE). This film is register printed with the pouch graphics on the surface of the OPET between the OPET and the BON and the three film layers are adhesive laminated. Normal packaging line speed is 40 cycles per minute.

Two test film structures were prepared, each meeting the requirement that the film is recyclable in the polyethylene recycling stream.

The first test film structure, Film 1, was an embodiment of the recyclable films described herein. Film 1 had an outer film of oriented polyamide (BON) and an inner film of polyethylene-based sealant including a layer of polar polymer compatibilizer. The compatibilizer used was Retain 3000, available from Dow Chemical Co. Film1 was printed on the surface of the BON between the BON and the inner film and the films were adhesive laminated.

The second test film structure, Film 2, was an all polyethylene film structure, printed on the exterior surface with ink and overlacquer. During the conversion of Film 2, it was found difficult to properly print the material to the required print repeat tolerances and the print had a generally poor appearance. This was attributed to the fact that Film 2 has poor dimensional stability.

Film 1 was run on the packaging line without any significant changes to the machine settings. Packages were formed at the same cycle speed as the non-recyclable high-performance material. The final packages passed the drop test without failures. In comparison, Film 2 did not run on the packaging line well. Film 2 was difficult to seal because of the lack of heat resistance. As a result, many of the packages produced from Film 2 failed the drop testing due to weak seals. Additionally, the packaging equipment did not run Film 2 well because the print tolerance was not accurate enough.

Recycling Test

Testing was also completed to understand the compatibility of the recyclable films in the polyethylene recycling stream. For this testing, a control film made nearly entirely of polyethylene materials was compared with a recyclable film having a BON exterior film (Test Film). Structures for these films are summarized in Table 1 and further detailed below.

TABLE 1

Structures of Recyclability Testing

| | |
|---|---|
| Control Film | 1 mil MDO PE/ink/adhesive/3.5 mil PE |
| Test Film | 48 ga BON/ink/adhesive/3.5 mil PE, compatibilizer and EVOH |

The MDO (machine direction oriented) PE portion of the Control Film was a three-layer film of high-density polyethylene/medium-density polyethylene/high-density polyethylene and included standard antiblock and slip additives. The ink was a polyurethane/nitrocellulose-base ink, standard to flexible packaging. The adhesive was a 2-component polyurethane based adhesive, also standard to flexible packaging. The 3.5 mil PE was a three-layer film. The layer next to the adhesive was a blend of 86% linear-low density polyethylene, 10% low-density polyethylene and the remainder polyethylene based additive masterbatch. The middle layer was 100% high-density polyethylene. The sealant layer was 94% metallocene catalyzed linear low-density polyethylene and the remainder polyethylene based additive masterbatch.

The inks and adhesive of the Test Film were identical to those used in the Control Film. The 3.5 mil PE film of the Test film had the 7-layer structure listed in Table 2.

TABLE 2

Sealant Structure of the Test Film

| Layer | Components |
|---|---|
| 1 | 73% low-density polyethylene, 25% linear low-density polyethylene, 2% polyethylene based masterbatch* |
| 2 | 63% low-density polyethylene, 22% linear low-density polyethylene, 15% anhydride functionalized ethylene/alpha-olefin compatibilizer |
| 3 | 92% high-density polyethylene an 8% anhydride functionalized ethylene/alpha-olefin compatibilizer |
| 4 | 100% EVOH (38 mole %) |
| 5 | 92% high-density polyethylene an 8% anhydride functionalized ethylene/alpha-olefin compatibilizer |
| 6 | 70% linear low-density polyethylene, 15% low-density polyethylene, 15% anhydride functionalized ethylene/alpha-olefin compatibilizer |
| 7 (sealant) | 78% linear low-density polyethylene, 16% low-density polyethylene, 6% polyethylene based masterbatch* |

*The polyethylene based masterbatch listed here contains high doses of slip, anti-block and/or processing aid components, as is common for coextruded films. These additives are supplied in a polyethylene base.

The Control Film was processed through a typical polyethylene recycling unit where it was melted, mixed and extruded into pellets. During the extrusion process an extrusion pressure of 1099 psi was recorded. Next, a blend of 75% Control Film and 25% Test Film were processed and resulted in an extrusion pressure of 979 psi. Finally, a blend of 50% Control Film and 50% Test Film were processed and resulted in an extrusion pressure of 1042. Since the extrusion pressure of the blended materials was below a 25% increase over the Control Film alone, it was found that the blends including the Test Film are acceptable. This is a good indication that the BON material in the test film is being adequately incorporated (i.e. compatibilized) into the polyethylene recycling stream.

In addition, the pellets produced from this recycling test were tested by DSC (Differential Scanning calorimetry). The pellets produced from the 75%/25% blend Control/Test were found to not display any peaks associated with polyamide melting. The pellets produced from the 50%/50% blend Control/Test were found to display very minor peaks associated with polyamide but were minimal and not considered concerning. Both blends of the Test Film passed the recycling test.

Embodiments

Embodiment A: A recyclable film comprising
  a an outer surface comprising a polar polymer,
  b an inner surface comprising a sealant, and
  c a polar polymer compatibilizer located between the outer surface and the inner surface.

Embodiment B: The recyclable film according Embodiment A, wherein the outer surface is an oriented film.

Embodiment C: The recyclable film according to Embodiment A or B, wherein the polar polymer is a polyamide.

Embodiment D: The recyclable film according to Embodiment C, wherein the outer surface is comprised essentially of polyamide.

Embodiment E: The recyclable film according to any of Embodiments A-D, wherein the recyclable film further comprises a barrier material.

Embodiment F: The recyclable film according to any of Embodiments A-F, wherein the recyclable film is comprised essentially of polar polymers and polyolefin polymers.

Embodiment G: A recyclable film comprising
  a an outer film comprising at least one polar polymer,
  b a sealant, and
  c a polar polymer compatibilizer located between the outer film and the sealant, wherein the outer film is oriented.

Embodiment H: The recyclable film according to Embodiment G, further comprising a barrier layer between the outer film and the sealant.

Embodiment I: The recyclable film according to Embodiment H, wherein the barrier layer comprises an ethylene vinyl alcohol copolymer.

Embodiment J: The recyclable film according to Embodiment H, wherein the barrier layer is adjacent to the outer film.

Embodiment K: A recyclable film comprising
  a an outer film comprising at least one polar polymer, and
  b a multilayer inner film comprising
    i an inner layer comprising a sealant, and
    ii a polar polymer compatibilizer layer,
    wherein the outer film is oriented and the outer film is attached to the multilayer inner film.

Embodiment L: The recyclable film of Embodiment K further comprising an attaching layer between the outer film and the multilayer inner film.

Embodiment M: The recyclable film of Embodiment K or L, wherein the multilayer inner film further comprises a barrier material.

Embodiment N: The recyclable film of Embodiment K or L, wherein the recyclable film further comprises a barrier material between the multilayer inner film and the outer film.

Embodiment O: The recyclable film according to any of Embodiments G-N, wherein the outer film is a multilayer film.

Embodiment P: The recyclable film of any of Embodiments G-O wherein the outer film is BON.

Embodiment Q: The recyclable film of any of Embodiments G-O wherein the outer film is OPET.

Embodiment R: The recyclable film according to any of Embodiments A-Q or S, further comprising printed indicia located adjacent to the outer film.

Embodiment S: The recyclable film according to any of Embodiments A-R, wherein the recyclable film is at least 95% of polar polymers and polyethylene polymers.

Embodiment T: A package comprising the recyclable film according to any previous Embodiment.

What is claimed is:

1. A recyclable film comprising:
   (a) an outer surface of an oriented film comprising a polar polymer,
   (b) an inner surface of an inner film comprising a sealant, and
   (c) a polar polymer compatibilizer layer laminating the oriented film and the inner film,
   wherein the polar polymer compatibilizer layer is a blend of polyethylene and a polar polymer compatibilizer that is a low molecular weight anhydride or carboxylic acid functionalized polyethylene.

2. The recyclable film according to claim 1, wherein the polar polymer is a polyamide.

3. The recyclable film according to claim 1, wherein the oriented film consists essentially of polyamide.

4. The recyclable film according to claim 1, wherein the recyclable film further comprises a barrier material between the outer surface and the inner surface.

5. The recyclable film according to claim 1, wherein the recyclable film consists essentially of polar polymers and polyolefin polymers.

6. The recyclable film of claim 1, wherein the polar polymer compatibilizer is effective to incorporate the polar polymer into a reprocessing or recycling stream of non-polar polymers.

7. A package comprising the recyclable film according to claim 1.

8. A recyclable film comprising:
   (a) an oriented outer film comprising at least one polar polymer,
   (b) an inner film comprising a sealant,
   (c) a polar polymer compatibilizer layer laminating the oriented outer film and the inner film, wherein the polar polymer compatibilizer layer is a blend of polyethylene and a polar polymer compatibilizer that is a low molecular weight anhydride or carboxylic acid functionalized polyethylene, and
   (d) a barrier layer between the oriented outer film and the inner film, wherein the barrier layer is adjacent to the outer film.

9. The recyclable film according to claim 8, wherein the barrier layer comprises an ethylene vinyl alcohol copolymer.

10. The recyclable film according to claim 8, further comprising printed indicia located adjacent to the outer film.

11. The recyclable film according to claim 8, wherein the recyclable film is at least 95% of polar polymers and polyethylene polymers.

12. The recyclable film according to claim 8, wherein the outer film is a multilayer film.

13. The recyclable film of claim 8, wherein the polar polymer compatibilizer is effective to incorporate the polar polymer into a reprocessing or recycling stream of non-polar polymers.

14. A recyclable film comprising:
   (a) an oriented outer film comprising at least one polar polymer, and
   (b) a multilayer inner film comprising:
      (i) an inner layer comprising a sealant, and
      (ii) a polar polymer compatibilizer layer,
   wherein the polar polymer compatibilizer layer is a blend of polyethylene and a polar polymer compatibilizer that is a low molecular weight anhydride or carboxylic acid functionalized polyethylene, the oriented outer film is laminated to the multilayer inner film.

15. The recyclable film of claim 14 further comprising an attaching layer between the oriented outer film and the multilayer inner film.

16. The recyclable film of claim 14, wherein the multilayer inner film further comprises a barrier material.

17. The recyclable film of claim 14, wherein the recyclable film further comprises a barrier material between the multilayer inner film and the oriented outer film.

18. The recyclable film of claim 14 wherein the outer film is BON.

19. The recyclable film of claim 14 wherein the outer film is OPET.

20. The recyclable film of claim 14, wherein the polar polymer compatibilizer is effective to incorporate the polar polymer into a reprocessing or recycling stream of non-polar polymers.

* * * * *